United States Patent [19]

Iftikar et al.

[11] 4,323,939
[45] Apr. 6, 1982

[54] HARD FIXED DISC DRIVE ASSEMBLY AND READ-WRITE HEAD ACTUATOR

[75] Inventors: Syed H. Iftikar, Fremont; David L. Reeck, San Jose, both of Calif.

[73] Assignee: Shugart Technology, Scotts Valley, Calif.

[21] Appl. No.: 139,428

[22] Filed: Apr. 11, 1980

[51] Int. Cl.³ .................. G11B 5/55; G11B 5/012; G11B 21/08
[52] U.S. Cl. ........................................ 360/106; 360/98
[58] Field of Search ............... 360/97, 98, 99, 106, 360/107, 109

[56] References Cited

U.S. PATENT DOCUMENTS

| | | | |
|---|---|---|---|
| 3,721,967 | 3/1973 | Englert | 360/106 |
| 3,733,592 | 5/1973 | Applequist | 360/106 |
| 3,749,827 | 7/1973 | Kinjo | 360/106 |
| 3,934,883 | 11/1916 | Chambers | 360/97 |
| 4,161,004 | 7/1979 | Dalziel | 360/109 |
| 4,200,894 | 4/1980 | Kaseta | 360/106 |

*Primary Examiner*—Robert M. Kilgore
*Attorney, Agent, or Firm*—Flehr, Hohbach, Test, Albritton & Herbert

[57] ABSTRACT

A hard fixed head disc drive assembly having a rotating record disc with a transducer cooperating with the surface of the disc. The transducer is mounted on a carriage which has three spaced, grooved bearings, two of which are received by a fixed cylindrical track, the third bearing engages a spring-loaded cylindrical track which urges said first two bearings against said fixed track, whereby the carriage is centered on said tracks for movement therealong radially of said disc surface.

3 Claims, 3 Drawing Figures

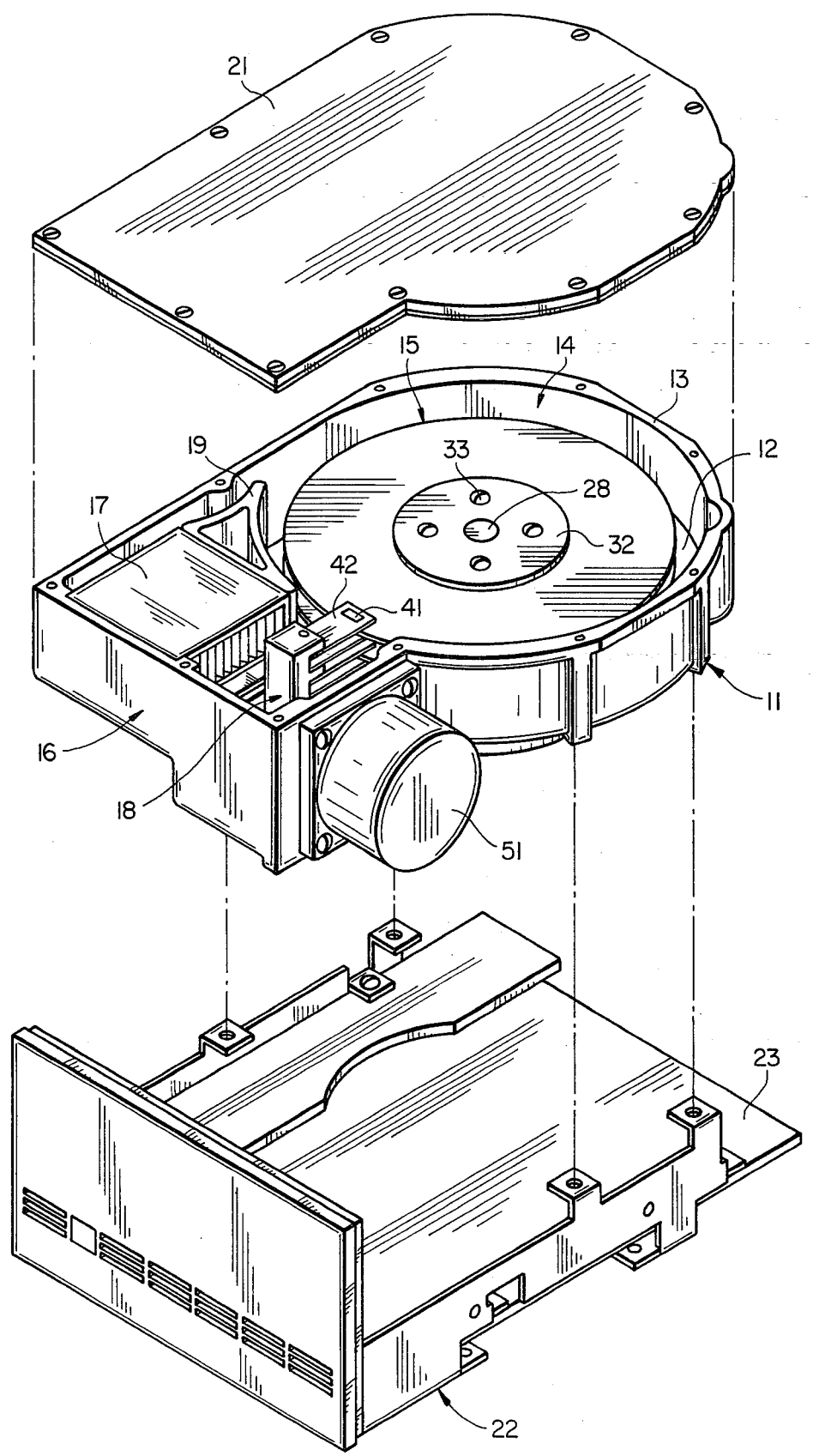
FIG__1

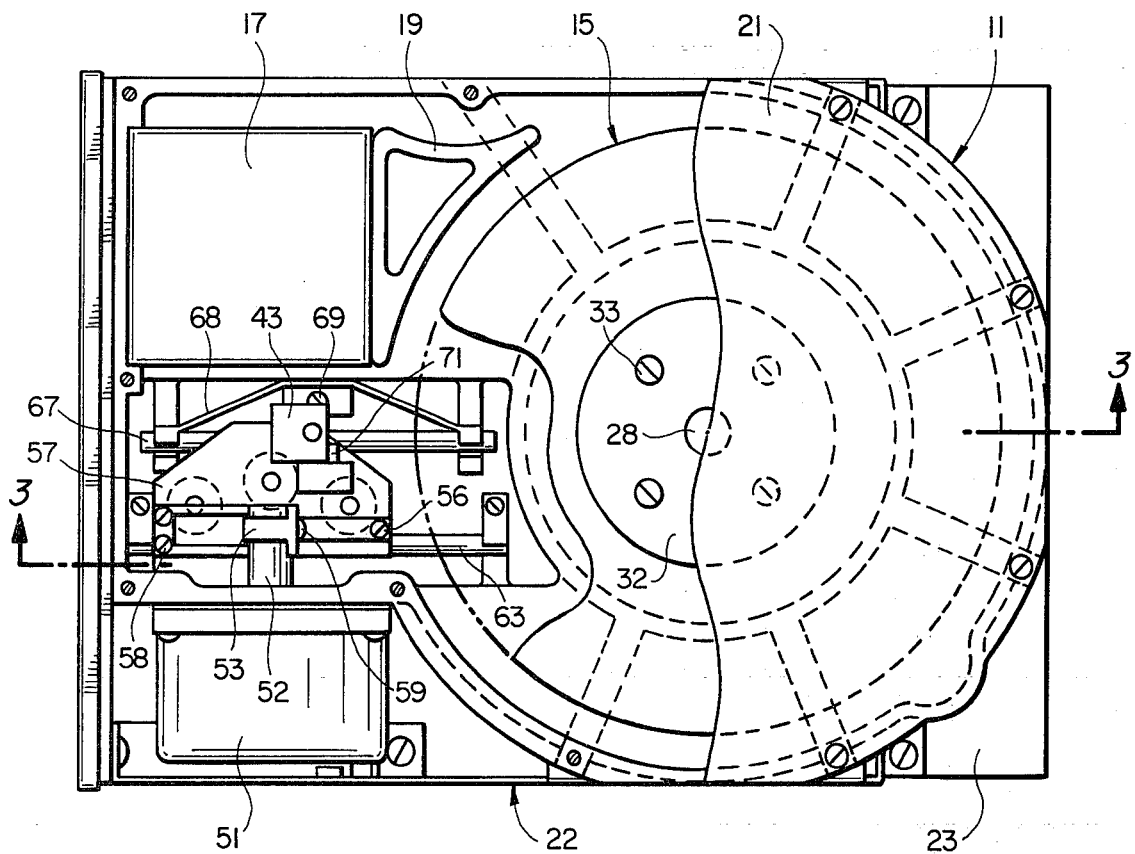
FIG_2
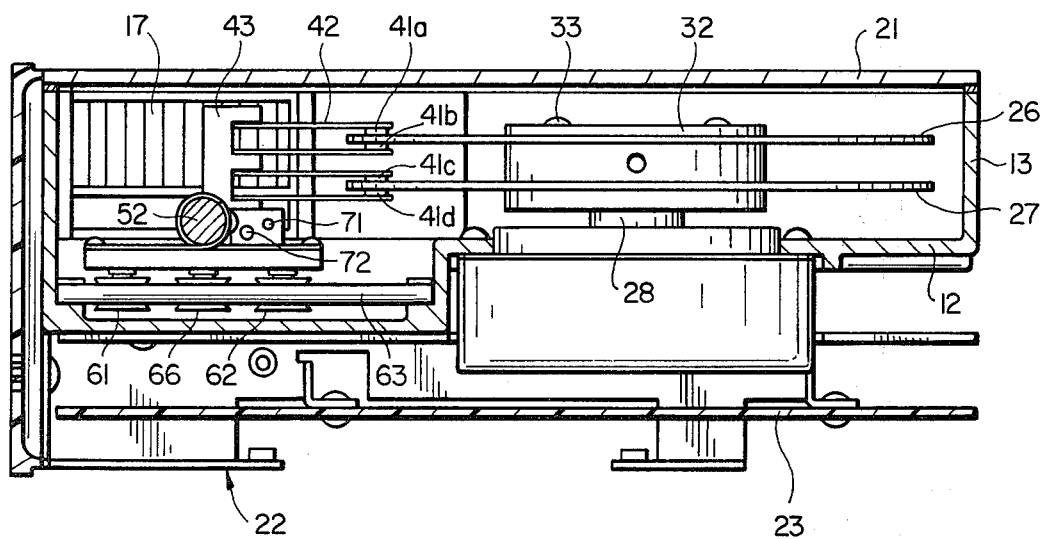
FIG_3

HARD FIXED DISC DRIVE ASSEMBLY AND READ-WRITE HEAD ACTUATOR

This invention relates generally to a hard fixed head disc drive assembly and to read-write head actuator therefor and more particularly to a linear read-write head actuator assembly.

Floppy disc drives are extensively used in connection with microcomputers, minicomputers, word processing equipment and for other data storage and data handling applications. In many such applications there is a requirement for compatible drive having a higher storage capacity than the floppy disc. Hard disc storage media have the capacity for higher storage density.

It is a general object of the present invention to provide a fixed hard disc drive which is physically compatible with conventional floppy disc drives.

In such high density apparatus, it is important to provide a read-write head drive or actuator which is capable of accurate tracking under high acceleration forces.

In accordance with another object of the present invention, there is provided a self-aligning carriage track assembly for a head actuator.

In accordance with another object of the present invention, there is provided a modular construction light-weight head support assembly.

The foregoing and other objects of the invention are achieved by a disc drive including a means for mounting a plurality of hard discs in fixed relationship with respect to one another and means for driving said mounting means to rotate the disc. A plurality of transducers cooperate with the surfaces of discs to read and write information on the surface. Mounting means are provided for mounting said transducer in spaced relationship for cooperation with the spaced discs. A carriage is provided for mounting the transducer mounting means. Suitable bearing means are mounted on the carriage. Spaced tracks receive said bearings to guide the carriage. One of said tracks is fixed and the other spring-loaded to preload the bearings against the fixed track. This assures accurate tracking to move the magnetic heads radially in and out along the surface of said fixed discs.

Referring to the figures:

FIG. 1 is an exploded perspective view of a disc drive assembly in accordance with the present invention.

FIG. 2 is a plan view partly in section showing a head drive assembly in accordance with the present invention.

FIG. 3 is a sectional view taken generally along the lines 3—3 of FIG. 2.

Referring to the figures, the disc drive assembly includes a housing 11 having a base 12 with upwardly extending sides 13. The configuration of the housing portion includes a cylindrical portion designated generally by numeral 14 adapted to receive a plurality of discs 15 and a rectangular portion designated generally by numeral 16 and including a filter assembly 17 at one end and a head drive assembly designated generally at 18 at the other end. Preferably, the filter 17 is a high efficiency filter with a relatively low pressure differential capable of filtering particles as small as 0.3 microns. An internal wall 19 serves to provide means for mounting the filter assembly 17 and for forming part of the cylindrical portion of the housing. A cover 21 is adapted to fit onto the housing walls and secured thereto to provide a hermetically sealed housing. The housing houses the discs, the filter assembly and the transducer drive assembly.

The housing is mounted on a chassis 22 which may accommodate a circuit board 23 including all of the electronic components necessary to control operation of the means for driving the discs and the magnetic heads.

Referring now more particularly to FIGS. 2 and 3, the fixed hard discs 26 and 27 are mounted on a spindle 28. A disc-shaped retainer 32 is secured by a plurality of screws 33 to the top of the spindle to securely hold the discs 26, 27 in spaced relationship with respect to one another.

Means are provided for holding and moving magnetic heads 41 in cooperation with the surfaces of the disc. The magnetic heads 41 are mounted upon a head mount 42 which is secured to a mounting block 53.

Referring particularly to FIGS. 2 and 3, the head actuator is seen to comprise a head drive motor 51 having a drive shaft 102 extending inwardly into one end of the rectangular portion of the housing. The drive motor is a stepping motor. The head drive motor shaft cooperates with a carriage drive band 53. The band includes an inner portion secured by a screw 56 to one end of a carriage 57 and a pair of outer portions secured by screws 57 to the other end of the carriage. The central common portion of the band is secured by a screw 59 to the shaft. Rotation of the shaft clockwise or counterclockwise winds and unwinds the band portions onto the shaft to move the carriage linearly. The carriage includes a plurality of spaced bearings disposed in a triangular configuration. Two of the bearings 61, 62 are adapted to ride along a fixed way or track 63 and the other bearing 66 is adapted to ride along a floating track 67. The track 67 is supported by a spring 68. The center of the spring is mounted to the housing by screw 67 and has its arms engage the ends of the floating track 67. The action of this spring is to press the track 67 against the bearing 64 which, in turn, forces the two bearings 61 and 62 against the fixed track whereby motion of the carriage is linearly along the track 63. The bearings include a grooved outer surface which engages cylindrical tracks 63, 67 and are seated thereon by the pressure of the spring loaded tracks. The forces center the bearings on the cylindrical tracks and prevent vertical movement of the carriage. The bearings bear upon the associated track at opposite points along the sides of the grooves and provide a line contact which minimizes friction as the carriage travels along the tracks. This self-aligning arrangement provides for minimum wear and increased bearing life and no backlash.

The carriage is relatively light and serves to mount an E-shaped mounting member 43 by means of suitable pin 71 and screw 72. The E-shaped member receives four Winchester-type heads 41a, 41b, 41c and 41d which cooperate with opposite surfaces of the discs 26 and 27.

Thereby, by controlling the stepper motor 51, the carriage moves linearly along the track 63 and moves the heads radially in and out along the surface of the discs to read and write circular recording tracks.

Preferably, the assembly has air circulation, as previously described, the minimize contaminants on the surface of the disc which might cause head crash.

Thus, there has been provided an improved disc drive assembly and head actuator therefor.

What is claimed is:

1. A disc drive including at least one disc, means for mounting said disc;

means for driving said mounting means to rotate the disc;

at least one transducer cooperating with the surface of said disc to read and write information on the surface;

mounting means for mounting said transducer for cooperation with the disc;

a carriage for said transducer mounting means;

three spaced bearings having grooved outer surfaces mounted on said carriage;

a fixed cylindrical track adapted to receive two of said bearings to guide the carriage;

a spring-loaded cylindrical track adapted to engage the other bearing and urge said two bearings against the fixed tracks whereby the bearings are centered on said tracks for movement therealong; and means for driving the carriage to move the carriage along said tracks so that the transducers are moved radially along the disc surface.

2. A drive assembly as in claim 1 including
a drive motor having a drive shaft,
a drive band secured to said carriage and driving by said drive shaft to move the carriage along said fixed track.

3. A disc drive as in claim 1 including a plurality of spaced discs and in which said mounting means includes means for mounting a plurality of heads for cooperation with each of said discs.

* * * * *